(12) United States Patent
Drentea

(10) Patent No.: US 6,882,310 B1
(45) Date of Patent: Apr. 19, 2005

(54) DIRECT SAMPLING GPS RECEIVER FOR ANTI-INTERFERENCE OPERATIONS

(75) Inventor: Cornell Drentea, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/686,167

(22) Filed: Oct. 15, 2003

(51) Int. Cl.[7] .............................................. H04B 7/185
(52) U.S. Cl. ............................................... 342/357.12
(58) Field of Search .......................... 342/352, 357.06, 342/357.12, 357.02; 701/213, 214, 215

(56) References Cited

U.S. PATENT DOCUMENTS

| | | | | |
|---|---|---|---|---|
| 5,268,927 A | * | 12/1993 | Dimos et al. ............... | 375/147 |
| 5,410,750 A | * | 4/1995 | Cantwell et al. ............ | 455/306 |
| 5,872,540 A | * | 2/1999 | Casabona et al. ........... | 342/362 |
| 6,127,975 A | * | 10/2000 | Maloney ..................... | 342/457 |
| 6,219,376 B1 | * | 4/2001 | Zhodzishsky et al. ...... | 375/148 |
| 6,310,963 B1 | * | 10/2001 | Erdol et al. ................. | 382/103 |
| 2004/0164900 A1 | * | 8/2004 | Casabona et al. ........... | 342/420 |

* cited by examiner

*Primary Examiner*—Dao Phan
(74) *Attorney, Agent, or Firm*—Renner, Otto, Boisselle, & Sklar, LLP

(57) ABSTRACT

A direct sampling global positioning system (GPS) receiver for anti-interference operations is provided. The GPS receiver includes an input for receiving an analog interference signal at GPS frequencies. In addition, the GPS receiver includes an analog-to-digital converter (ADC), operatively coupled to the input, for converting the analog interference signal into a digital signal. Moreover, the GPS receiver includes a processor for processing the digital signal to detect interference at the GPS frequencies and providing an output based thereon.

19 Claims, 3 Drawing Sheets

DIRECT SAMPLING GPS RECEIVER FOR ANTI-INTERFERENCE OPERATIONS

TECHNICAL FIELD

The present invention relates generally to global positioning system (GPS) receivers, and more particularly to a GPS receiver for anti-interference operations.

BACKGROUND OF THE INVENTION

Global positioning systems, such as the US NAVSTAR GPS and Russian GLONASS, are known. The NAVSTAR GPS developed by the U.S. Department of Defense is a satellite-based radio navigation system that transmits information from which extremely accurate navigational calculations can be made in three-dimensional space anywhere on or near the Earth. Three-dimensional velocity can be determined with similar precision. GPS uses eighteen to twenty-four satellites that may be evenly dispersed in three inclined twelve-hour circular orbits chosen to ensure continuous twenty-four hour coverage worldwide. Each satellite uses extremely accurate cesium and rubidium vapor atomic clocks for generating a time base. Each satellite is provided with clock correction and orbit information by Earth-based monitoring stations. Each satellite transmits a pair of L-band signals. The pair of signals includes an L1 signal at a frequency of 1575.42 MHz and an L2 signal at a frequency of 1227.6 MHz. The L1 and L2 signals are biphase signals modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The ephemeris data is used in conjunction with a set of Keplerian equations to precisely determine the location of each satellite. The receiver measures a phase difference (i.e., time of arrival) of signals from at least four satellites. The time differences are then used to solve a matrix of four equations. The result is a precise determination of the location of the receiver in three-dimensional space. Velocity of the receiver may be determined by a precise measurement of the L1 and L2 frequencies. The measured frequencies are used to determine Doppler frequency shifts caused by differences in velocity. The measured differences are used to solve another set of equations to determine the velocity based upon the Doppler phase shift of the received signal.

The utility of the GPS for guidance applications is well recognized. For military applications, GPS allows self-guided weapons to find targets with heretofore unknown degrees of accuracy. Unfortunately, GPS guidance systems use 10 watt signals from satellites in an eleven thousand nautical mile orbit. Consequently, such GPS systems are notoriously prone to interference, particularly man-made interference and RF jamming. Such compromises to GPS systems can adversely affect the navigation and precision of GPS-aided weapons. The susceptibility of GPS receivers to interference therefore necessitates an effective system for alleviating such problems.

GPS anti-interference capability has been developed in the past, but has exhibited performance limitations. Such limitations have to do with classic receiver architectures involving RF mixers and synthesizers. Specifically, for example, such classic architectures are expensive and require precision components and tuning.

Accordingly, there is a strong need in the art for a low cost system and method for overcoming the effects of interference in a GPS system.

SUMMARY OF THE INVENTION

According to one aspect of the invention, a direct sampling global positioning system (GPS) receiver for anti-interference operations is provided. The GPS receiver includes an input for receiving an analog interference signal at GPS frequencies. In addition, the GPS receiver includes an analog-to-digital converter (ADC), operatively coupled to the input, for converting the analog interference signal into a digital signal. Moreover, the GPS receiver includes a processor for processing the digital signal to detect interference at the GPS frequencies and providing an output based thereon.

In accordance with another aspect of the invention, a GPS anti-interference system is provided for locating a source of the analog interference signal. The system includes an antenna array and a plurality of the above-mentioned GPS receivers. The inputs of the plurality of receivers are coupled to elements of the antenna array so as to receive the analog interference signal. Each of the plurality of receivers digitize the analog interference signal and a combined output of the plurality of receivers is indicative of the location of the source of the analog interference signal.

According to still another aspect of the invention, a method for conducting direct sampling global positioning system (GPS) anti-interference operations is provided. The method includes the steps of receiving an analog interference signal at GPS frequencies; converting the analog interference signal into a digital signal; and processing the digital signal to detect interference at the GPS frequencies and providing an output based thereon.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF TH INVENTION

Figure 1:
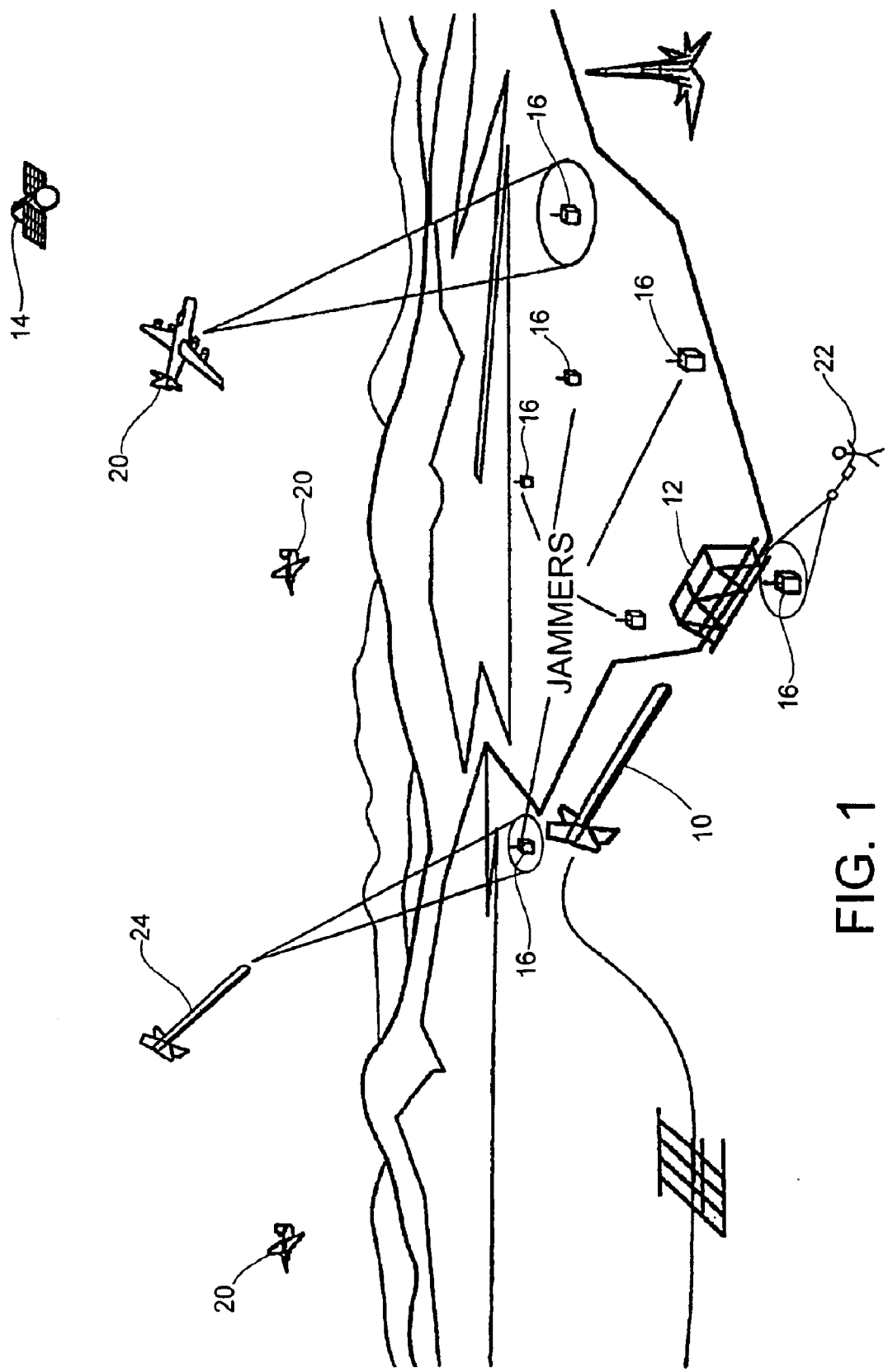
FIG. 1 is an environmental view of an operational environment including GPS guided weaponry and one or more GPS anti-interference systems in accordance with an embodiment of the invention.

The present invention will now be described with reference to the figures, wherein like reference numerals are used to refer to like elements throughout.

Referring initially to FIG. 1, shown is a diagram depicting an operational environment including GPS guided weaponry and one or more GPS anti-interference systems in accordance with an embodiment of the invention. Conventionally, a missile 10 is guided to a target 12 using GPS signals from a satellite 14. Unfortunately, as mentioned above, a small number of low cost jammers 16 may effectively defeat the system by introducing electromagnetic interference at the GPS frequencies (i.e., the carrier frequencies of the GPS signals, e.g., L1 and L2). When the GPS link is lost is due to such interference, the missile 10 may drift considerably.

The present invention addresses this problem by providing a low cost system for overcoming the effects of GPS interference. More particularly, the present invention relates to a low cost GPS receiver for detecting interference operations. Multiple GPS receivers may be part of one or more GPS anti-interference systems for detecting and locating jammers 16.

For example, a GPS anti-interference system in accordance with the present invention may be located in an aircraft 20. Through the use of low cost GPS receivers as is explained in more detail below in relation to FIGS. 2 and 3, the system permits the aircraft 20 to detect and locate a jammer 16. The aircraft 20 may then disable the jammer 16 by direct strike, providing location coordinates to another strike vehicle, etc.

As another alternative, a ground based GPS anti-interference system in accordance with the invention may be utilized by ground personnel 22, for example. Again, the low cost GPS receivers allow ground personnel 22 to detect and locate a jammer 16 so that the jammer 16 may be disabled.

As yet another alternative, a GPS anti-interference system in accordance with the invention may be utilized as part of a guidance system. For example, a missile 24 may include low cost GPS receivers in accordance with the invention to detect, locate and lock onto a jammer 16.

Figure 2:
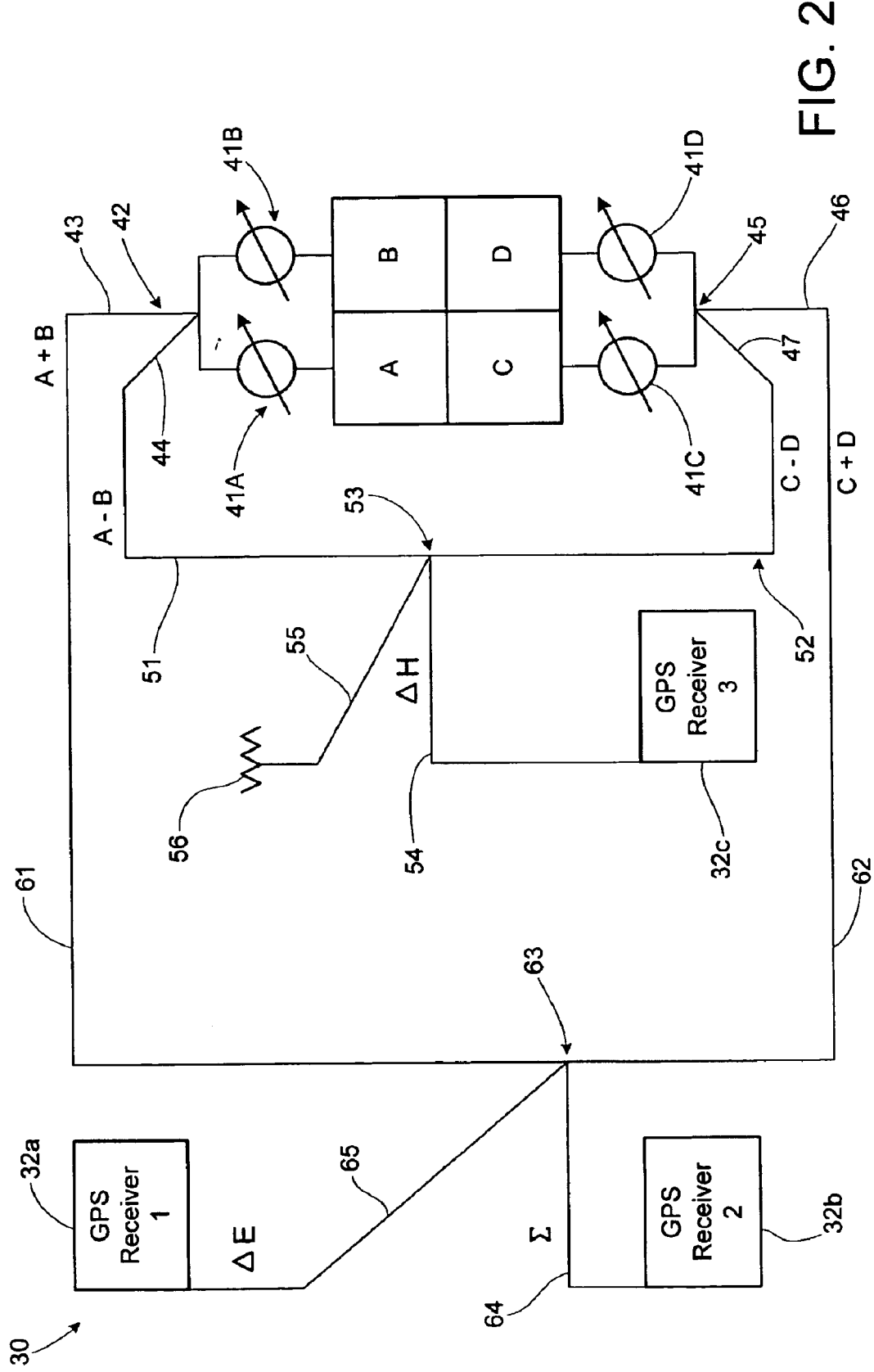
FIG. 2 is a block diagram of an exemplary GPS anti-interference system in accordance with an exemplary embodiment of the present invention.

Turning now to FIG. 2, an exemplary configuration of a GPS anti-interference system 30 is shown in accordance with the present invention. The system 30 utilizes three GPS receivers 32a, 32b and 32c, each of the type described below in relation to FIG. 3. Each of the GPS receivers is designed to receive electromagnetic interference signals at the GPS frequencies. The system 30 is arranged in a conventional monopulse comparator configuration, for example, in which the outputs of the receivers 32a, 32b and 32c are indicative of the location (azimuth and elevation) of the interference source (i.e., the jammer 16).

FIG. 2 presents a diagrammatic representation of a monopulse comparator arithmetic network for providing sum, differential azimuth and differential elevation information by combining signals from four antenna ports designated A, B, C and D. The antenna ports are part of an antenna or antennas designed to receive electromagnetic interference signals at the GPS frequencies. The four ports may be regarded as associated with four beams each centered at the corner of a square centered about the antenna axis. Alternatively, the four antenna ports may be associated with separate antennas, for example.

In the exemplary embodiment, ports A and C are associated with beams in vertical alignment on one side of the square while ports C and D are associated with beams on the other side of the square in vertical alignment. The beams associated with ports A and B will then be in horizontal alignment separated from the beams associated with ports B and D in horizontal alignment by the antenna center axis.

The signals from ports A and B are coupled by phase shifters 41A and 41B to hybrid junction 42 that provide their cumulative combination on branch 43 and their differential combination on branch 44. Similarly ports C and D are coupled by phase shifters 41C and 41D to hybrid junction 45 which provides their cumulative combination on branch 46 and their differential combination on branch 47.

Lines 51 and 52 couple the signals from branches 44 and 47, respectively, to hybrid junction 53 which provides their cumulative combination on branch 54 as the azimuth differential signal ΔH. The remaining branch 55 is terminated by impedance 56. Lines 61 and 62 couple branches 43 and 46 to hybrid junction 63 which provides the cumulative combination of the signals on these branches on branch 64 as the sum signal Σ and their differential combination on branch 65 as the elevation differential signal ΔE.

As is shown in FIG. 2, GPS receiver 32a receives as its input the elevation differential signal ΔE. Similarly, the GPS receivers 32b and 32c receive as inputs the sum signal Σ and azimuth differential signal ΔH, respectively. In each case, the inputs represent analog interference signals specifically at GPS frequencies. By detecting the energy level of each of the ΔE, ΔH and Σ signals via the GPS receivers 32a, 32b and 32c, the precise azimuth and elevation of the source of the interference may be detected relative to the antenna(s), as is well known in the art. Thus, the present invention provides a means by which a source of interference signals at GPS frequencies may be detected and located.

Figure 3:
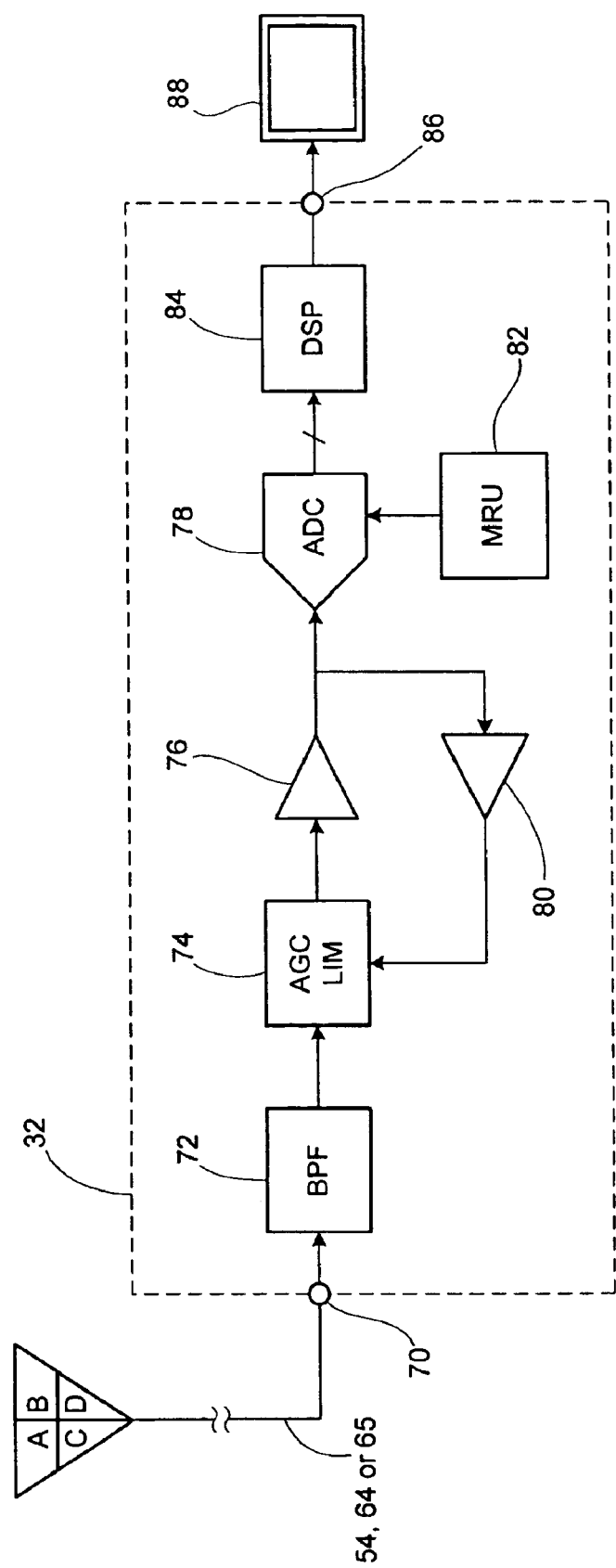
FIG. 3 is a block diagram of an exemplary direct sampling GPS receiver for anti-interference operations in accordance with an exemplary embodiment of the present invention.

Referring now to FIG. 3, a configuration of a low cost GPS receiver 32 for anti-interference operations is shown in accordance with the exemplary embodiment of the present invention. As will be appreciated, each of the receivers 32a, 32b and 32c shown in FIG. 2 have the same configuration represented by the receiver 32 in FIG. 3.

The GPS receiver 32 is a direct sampling receiver. The analog interference signal at the GPS frequencies is sampled and digitized by an analog-to-digital converter without down-conversion to an intermediate or baseband signal. The GPS receiver 32 does not utilize the classic receiver architecture involving RF mixers and synthesizers. Consequently, the GPS receiver can be less expensive than such classic architecture and not require precision components and tuning.

As shown in FIG. 3, the GPS receiver 32 includes an input 70 for receiving the analog interference signal at GPS frequencies. The analog interference signal may be directly from an antenna or via a hybrid or the like (e.g., via line 54, 64 or 65 of FIG. 2), for example. The input analog interference signal is input to a bandpass filter 72 included in the GPS receiver 32. The bandpass filter 72 has a passband that includes the GPS frequencies (e.g., L1=1575.42 MHz and L2=1227.6 MHz), and that filters out frequencies above and below the GPS frequencies.

The bandpass filter 72 provides the filtered analog interference signal to an automatic gain control (AGC) limiter 74 also included in the GPS receiver 32. The AGC limiter 74 protects the internal circuitry of the GPS receiver 32 from being overdriven in the case of a high power interference signal (e.g., due to a high power jammer 16, etc.). Using conventional techniques, the limiter 74 limits the maximum power level of the filtered analog interference signal. The analog interference signal is input from the limiter 74 to a radio frequency (RF) amplifier 76 included in the GPS receiver 32. The amplifier 74 amplifies the analog interference signal prior to it being input to an analog-to-digital converter (ADC) 78 also included in the GPS receiver 32. In addition, the output of the amplifier 74 is fed back to the AGC limiter 74 via an AGC detector amplifier 80 so as to automatically control the gain.

The limit of the AGC limiter 74 and the gains of the amplifiers 76 and 80 are selected so as to maximize use of the dynamic range of the ADC 78. In accordance with the present invention, the ADC 78 directly samples the analog interference signal output from the amplifier 76. There is no downconverting of the analog interference signal into an intermediate frequency or baseband signal frequency. Rather, the ADC 78 samples the analog interference signal without frequency conversion at a sample rate determined by a clock signal provided by a master reference unit (MRU) 82. Such sampling rate may be on the order of about 2 Gigahertz (or $2 \times 10^9$ samples/second), or greater, for example.

It is noted that although a sampling frequency of 2 Ghz is less than twice the frequency of the GPS frequencies L1 and L2, and thus does not satisfy the Nyquist criterion, sampling at such rate still is useful with regard to the invention. Specifically, detection of the energy at the GPS frequencies by the receivers 32 does not require the ability to detect any other frequencies that may be present in the analog interference signal. Of course, as ADCs having sample rates beyond 2 Ghz become more prevalent and economical, the entire frequency spectrum of the analog interference signal may be captured if desirable.

In the exemplary embodiment, the ADC 78 is a flash type (i.e., parallel bit) ADC. For example, there are now commercially available 10-bit, $2 \times 10^9$ samples/second ADCs suitable for use in accordance with the invention. The GPS receiver 32 incorporating such an ADC can exhibit a minimum discernible signal (MDS) of −60 dBm and 1 dB input compression point (CP1) of 0 dBm (with no AGC applied), without using the conventional superheterodyne approach. The dynamic range can be extended by using the AGC. Such a GPS receiver 32 allows for the detection of a 1 Kilowatt jammer 16 at up to about 20 kilometers (even without a low noise amplifier).

The digitized interference signal is output from the ADC 78 into a digital signal processor (DSP) 84 that processes the signal in order to detect the presence of interference at the GPS frequencies. For example, the DSP 84 may employ a series of finite impulse response (FIR) filters designed to identify signals at the GPS frequencies within the digitized interference signal. Methods for designing and carrying out such FIR filters are well known, and therefore will not be described in detail for sake of brevity.

The output of the DSP 84 via output 86 indicates the magnitude of the RF energy detected by the GPS receiver 32 at the GPS frequencies. This information may then be combined with the output of the other GPS receivers 32 as shown in FIG. 2, for example, to provide the exact location of the source of the GPS interference. Such location information may then be provided on a display 88 or the like, for example. The location information may be used by the pilot of an aircraft 20 (FIG. 1) or ground personnel 22 to provide coordinates to eliminate the jammer 16. Alternatively, the location information may be provided internally within a missile guidance system to direct the missile to strike the jammer 16.

Those having ordinary skill in the art will therefore appreciate the manner in which the present invention provides a low cost system for overcoming the effects of GPS interference. More particularly, they will appreciate how the present invention relates to a low cost GPS receiver for detecting interference operations. Multiple GPS receivers may be part of one or more GPS anti-interference systems for detecting and locating the source of GPS interference.

While the present invention is described herein with reference to illustrative embodiments for particular applications (e.g., weapons guidance), it should be understood that the invention is not limited thereto. Those having ordinary skill in the art and access to the teachings provided herein will recognize additional modifications, applications, and embodiments within the scope thereof and additional fields in which the present invention would be of significant utility.

Although the invention has been shown and described with respect to certain preferred embodiments, it is obvious that equivalents and modifications will occur to others skilled in the art upon the reading and understanding of the specification. For example, while the invention has been described primarily in the context of detecting man-made intentional interference (e.g., jammers 16), it will be appreciated that the present invention is equally applicable to detecting other types of interference. The present invention includes all such equivalents and modifications, and is limited only by the scope of the following claims.

What is claimed is:

1. A direct sampling global positioning system (GPS) receiver for anti-interference operations, comprising:
   an input for receiving an analog interference signal at GPS frequencies;
   an analog-to-digital converter (ADC), operatively coupled to the input, for converting the analog interference signal into a digital signal; and
   a processor for processing the digital signal to detect interference at the GPS frequencies and providing an output based thereon.

2. The receiver of claim 1, wherein the ADC is a flash ADC.

3. The receiver of claim 2, wherein the ADC samples the analog interference signal at a sampling frequency of approximately 2 gigahertz or greater.

4. The receiver of claim 1, further comprising a bandpass filter coupled between the input and the ADC with a pass band comprising the GPS frequencies.

5. The receiver of claim 1, further comprising an automatic gain control circuit for controlling a power level of the analog interference signal input to the ADC.

6. The receiver of claim 1, wherein the processor utilizes a plurality of finite impulse response (FIR) filters.

7. The receiver of claim 6, wherein the plurality of FIR filters are implemented via machine code executed by the processor.

8. A GPS anti-interference system for locating a source of the analog interference signal, comprising:
   an antenna array; and
   a plurality of receivers as recited in claim 1,
   wherein the inputs of the plurality of receivers are coupled to elements of the antenna array so as to receive the analog interference signal; and
   each of the plurality of receivers digitize the analog interference signal and a combined output of the plurality of receivers is indicative of the location of the source of the analog interference signal.

9. The system of claim 8, wherein the ADC in each of the plurality of receivers is a flash ADC.

10. The system of claim 9, wherein the ADCs sample the analog interference signal at a sampling frequency of approximately 2 gigahertz or greater.

11. The system of claim 8, wherein each of the plurality of receivers further comprises a bandpass filter coupled between the input and the ADC with a pass band comprising the GPS frequencies.

12. The system of claim 8, wherein each of the plurality of receivers further comprises an automatic gain controlcircuit for controlling a power level of the analog interference signal input to the ADC.

13. The system of claim 8, wherein the processor in each of the plurality of receivers utilizes a plurality of finite impulse response (FIR) filters.

14. The system of claim 13, wherein the plurality of FIR filters are implemented via machine code executed by the processor.

15. A method for conducting direct sampling global positioning system (GPS) anti-interference operations, the method comprising the steps of:

receiving an analog interference signal at GPS frequencies;

converting the analog interference signal into a digital signal; and processing the digital signal to detect interference at the GPS frequencies and providing an output based thereon.

16. The method of claim 15, wherein the step of converting the analog interference signal into a digital signal is done using a flash ADC.

17. The method of claim 16, wherein the ADC samples the analog interference signal at a sampling frequency of approximately 2 gigahertz or greater.

18. The method of claim 15, further comprising the step of bandpass filtering the analog interference signal with a pass band comprising the GPS frequencies prior to converting the analog interference signal into the digital signal.

19. The method of claim 15, further comprising the step of performing automatic gain control to control a power level of the analog interference signal prior to converting the analog interference signal into the digital signal.

* * * * *